May 13, 1958 — G. C. AKERLOF — 2,834,055
PREPARATION OF POLYETHYLENE
Filed June 22, 1955
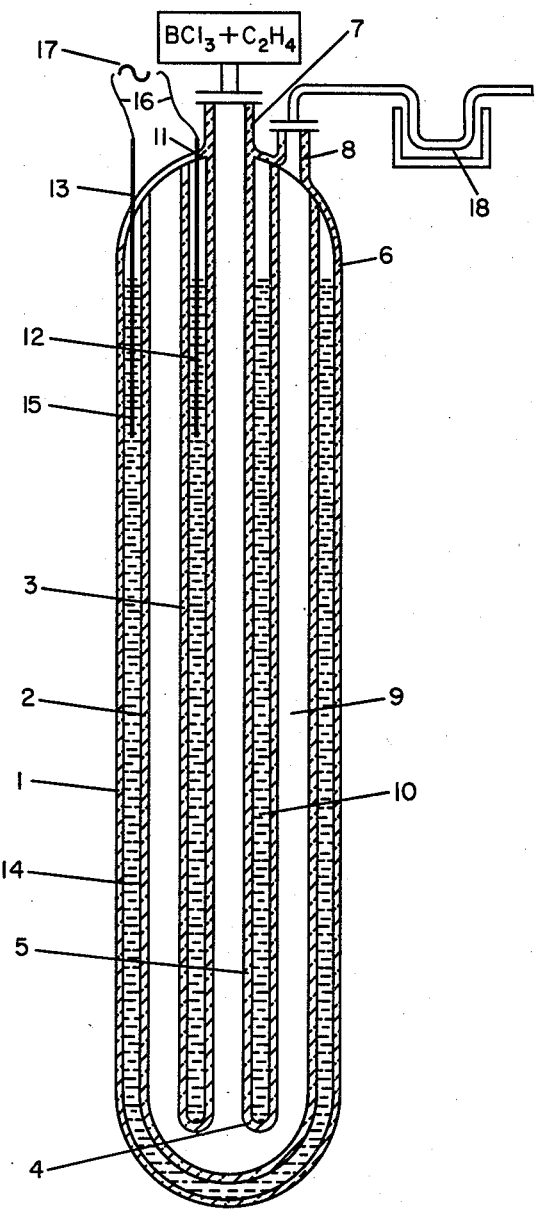
Gösta C. Akerlof
INVENTOR.
BY Neal J Mosely
his Attorney United States Patent Office 2,834,055
Patented May 13, 1958

2,834,055

PREPARATION OF POLYETHYLENE

Gosta Carl Akerlof, Princeton, N. J., assignor to Callery Chemical Company, Pittsburgh, Pa., a corporation of Pennsylvania Application June 22, 1955, Serial No. 517,213

6 Claims. (Cl. 18—58)

This invention relates to a new and improved method for the preparation of polyethylene and more particularly it relates to a new and improved method for its preparation in an electrodeless discharge.

Polyethylene is usually made by passing ethylene over a catalyst, such as benzoyl peroxide, at a temperature of 100°–300° C. and a pressure of about 1000 atmospheres. This process is used commercially although it has several disadvantages. These disadvantages are: (1) ethylene of high purity is required since certain reactive impurities have a profound effect on the chain length of the product (2) the necessity for expensive compression equipment and a reaction vessel which will withstand the high working pressures necessary to carry out the reaction (3) control of the rapid and highly exothermic polymerization is extremely hazardous and may result in violent explosions. It would therefore be highly desirable to develop a method for preparing polyethylene which can be readily controlled, does not require ethylene of high purity, and which can be utilized without excessive capital expenditures for high pressure equipment.

It is an object of this invention to provide a method for preparing polyethylene which is simple and economical to carry out.

Another object is to provide a new and useful method for polymerizing ethylene by means of an electrodeless discharge (also known as the silent electric discharge).

Other objects will appear throughout the specification and appended claims which follow.

This new and improved method for preparing polyethylene will be more fully described hereinafter and the novelty thereof will be particularly pointed out and distinctly claimed.

This invention is based upon the discovery that ethylene can be polymerized at ordinary temperatures and pressures by subjecting a mixture of ethylene and a very small amount of boron trichloride to an electrodeless discharge in the low frequency A. C. range (less than about 10 kc.). The conditions required to produce polyethylene by this general method may be varied over wide ranges with respect to the composition of the original reaction mixture, current characteristics, operating temperature and the design of the reaction vessel.

The number of new compounds that may be produced in an electric discharge is as large as the number that has been synthesized by more usual methods. In general, an electric discharge may cause formation, decomposition or transformation of a given compound depending upon its nature. The mechanism of the reaction taking place is, as a rule, very complex due to the appearance of large numbers of highly active radicals having a short life time and which either form entirely new compounds or reunite with the parent substance to form molecules with increasingly higher molecular weight. In this manner a gas like ethylene may be transformed to solid polyethylene.

The reactor used to carry out this process is shown in the accompanying drawings. Basically this reactor consists of four concentric glass tubes 1, 2, 3 and 5. The tubes 3 and 5 are joined at their lower ends as indicated at 4 so that the annular space between tubes 2 and 3 opens into the interior of tube 5. These tubes were blown together at the top with a ringseal 6. The center tube 5 is provided with an inlet opening 7 which is connected to a source of ethylene and $BCl_3$. The mixture of ethylene and $BCl_3$ enters through the inlet 7, passes downward through the central tube 5 and upward through the annular space 9 between the tubes 2 and 3 and is discharged through an outlet opening 8 which is connected to a cold trap 18 where the gases are condensed. The outer annular space 14 between the tubes 1 and 2 is filled with a solution of sodium chloride in glycerine, or any other suitable conducting solution. The outer annular space 14 is provided with an electrode 15 which is sealed in the upper wall of the reactor as indicated at 13. The inner annular space 10 between the tubes 3 and 5 is similarly filled with a conducting solution of sodium chloride in glycerine and is provided with an electrode 12 which may be sealed in the glass wall as indicated at 11. The electrodes 12 and 15 are connected by an electric lead 16 to a high frequency power supply 17 which in this case consisted of a variable transformer capable of covering the frequency range of 400 to 1200 cycles per second.

In one experiment, using the reactor described a mixture of 7.7 liters of ethylene and 1 liter of boron trichloride were subjected to an electrodeless discharge at atmospheric pressure and room temperature. The frequency of the applied electromotive force was 800 cycles per second. After a rapid rise of the current to a value slightly above 100 milliamperes at a voltage of 8.1 kilovolts, the current soon showed a sharp drop. A gas sample drawn from the reactor showed on spectroscopic analysis the complete absence of ethylene while the boron trichloride concentration remained unchanged. The inside of the reactor was coated with a uniform white plastic solid which was removed by washing with hydrofluoric acid and acetone. Evaporation of the acetone left a firm solid identified as a very high molecular weight polyethylene. Thus, practically the entire amount of ethylene present was transformed to polyethylene.

This invention is also useful as a molding process for making plastic objects of various shapes. A separable glass form of suitable shape is constructed with inlet and outlet connections for flowing ethylene therethrough. The ethylene can then be polymerized by passing an electrodeless discharge through the form and the polyethylene will deposit uniformly on the inner surfaces of the form. When the form is separated, the plastic object may be removed intact.

Having thus described this invention fully and completely as required by the patent laws including what is now considered to be its best embodiment, it should be understood that within the scope of the appended claims this invention may be practiced otherwise than as specifically described.

What I claim and desire to secure by United States Patent is:

1. A method of preparing polyethylene which comprises subjecting a mixture of ethylene and boron trichloride to an electrodeless discharge, and recovering solid polyethylene thus formed.

2. A method according to claim 1 in which the reaction is carried out at room temperature and atmospheric pressure.

3. A method according to claim 1 in which the frequency of the electrodeless discharge used is in the low frequency A. C. range.

4. A method according to claim 1 in which the boron trichloride is present in a very small amount.

5. A method of depositing a uniform coating of solid polyethylene on the interior of a hollow form which comprises passing a mixture of ethylene and boron trichloride through the form while subjecting the mixture to an electrodeless discharge.

6. A method according to claim 5 in which the hollow form is a mold and the polyethylene deposit is recovered as a molded piece.

References Cited in the file of this patent

UNITED STATES PATENTS

| | | |
|---|---|---|
| 2,265,226 | Clewell et al. | Dec. 9, 1941 |
| 2,369,520 | Barnes | Feb. 13, 1945 |
| 2,676,145 | Weisz et al. | Apr. 20, 1954 |

FOREIGN PATENTS

| | | |
|---|---|---|
| 295,705 | Great Britain | 1929 |

OTHER REFERENCES

Ipatieff: Transactions Electrochemical Society, vol. 71 (1937), pp. 333–43.